United States Patent
Kim et al.

(10) Patent No.: US 8,647,476 B2
(45) Date of Patent: Feb. 11, 2014

(54) DEVICE FOR FEEDING COMBUSTION AIR OR GAS INFLUENCING COAL CARBONIZATION INTO THE UPPER AREA OF COKE OVENS

(75) Inventors: Ronald Kim, Essen (DE); Ralf Schumacher, Hagen (DE)

(73) Assignee: UHDE GmbH, Dortmund (DE)

( * ) Notice: Subject to any disclaimer, the term of this patent is extended or adjusted under 35 U.S.C. 154(b) by 924 days.

(21) Appl. No.: 12/733,517

(22) PCT Filed: Aug. 22, 2008

(86) PCT No.: PCT/EP2008/006918
§ 371 (c)(1),
(2), (4) Date: Jun. 2, 2010

(87) PCT Pub. No.: WO2009/033557
PCT Pub. Date: Mar. 19, 2009

(65) Prior Publication Data
US 2010/0300867 A1   Dec. 2, 2010

(30) Foreign Application Priority Data
Sep. 7, 2007  (DE) .......... 10 2007 042 502

(51) Int. Cl.
| C10B 21/22 | (2006.01) |
| C10B 47/10 | (2006.01) |
| C10B 21/10 | (2006.01) |
| C10B 25/06 | (2006.01) |

(52) U.S. Cl.
USPC .......... 201/36; 201/37; 201/38; 202/135; 202/151

(58) Field of Classification Search
USPC .......... 201/36, 37, 38; 202/135, 151
See application file for complete search history.

(56) References Cited

U.S. PATENT DOCUMENTS 1,898,267 A * 2/1933 Schaefer .......... 201/26
1,907,202 A * 5/1933 Ryan .......... 201/1

(Continued)

FOREIGN PATENT DOCUMENTS

| CA | 2 052 177 C | 3/1992 |
| DE | 10 2005 015 301 A1 | 10/2006 |
| DE | 20 2005 025 955 B3 | 3/2007 |
| DE | 10 2005 055 483 A1 | 5/2007 |
| DE | 10 2006 005 189 A1 | 8/2007 |
| GB | 1 555 400 | 11/1979 |
| WO | WO 2006 103 043 A1 | 10/2006 |
| WO | WO 2006 128 612 A1 | 12/2006 |
| WO | WO 2007 057 076 A1 | 5/2007 |

OTHER PUBLICATIONS

Otto, Dr. C., Catalogue of Dr. C. Otto Feuerfest GmbH, Feuerfest-Erzeugnisse, Rohstoffe und Zusammensetzungen, 1996, p. 11, Bochum, Germany.

*Primary Examiner* — Nina Bhat
*Assistant Examiner* — Jonathan Miller
(74) *Attorney, Agent, or Firm* — Marshall & Melhorn, LLC

(57) ABSTRACT

Disclosed is a device and a method for feeding primary combustion air for the combustion of coke oven gas into a coking chamber of a coke oven of the non-recovery or heat recovery type, the coke oven is provided with openings in the oven chamber through which the oven chamber can be charged with primary air, and heating flues in the oven chamber sole with openings through which the heating flues can be charged with secondary air, and downcomer-channels which allow for guiding partially burned gas for combustion with secondary air from the oven chamber into the heating flues, wherein in the oven wall above the door or in the upper door area there are one or more non-controlled openings comprised of a heat-proof material through which part of the primary air can be guided, and in the top area of the oven there are further controllable air feeder ducts conducting primary air through the oven top.

46 Claims, 4 Drawing Sheets

(56) References Cited

U.S. PATENT DOCUMENTS

| | | | |
|---|---|---|---|
| 2,098,013 A * | 11/1937 | Pavitt | 202/142 |
| 4,287,024 A | 9/1981 | Thompson | |
| 4,344,820 A | 8/1982 | Thompson | |
| 4,544,451 A * | 10/1985 | Weber et al. | 202/114 |
| 5,114,542 A | 5/1992 | Childress et al. | |
| 5,318,671 A | 6/1994 | Pruitt | |
| 2008/0271985 A1 * | 11/2008 | Yamasaki | 202/248 |
| 2009/0152092 A1 | 6/2009 | Kim et al. | |
| 2009/0217576 A1 | 9/2009 | Kim et al. | |
| 2010/0025217 A1 | 2/2010 | Schuecker et al. | |

* cited by examiner

DEVICE FOR FEEDING COMBUSTION AIR OR GAS INFLUENCING COAL CARBONIZATION INTO THE UPPER AREA OF COKE OVENS

BACKGROUND OF THE INVENTION

The present invention relates to a device for feeding combustion air into a battery of coke ovens, said device allowing for an even and efficient feed of air to these coke ovens in the area above the oven door opening or in the upper door area and wherein the air feeding device in the oven wall above the door area or in the upper door area is supported by air feeder ducts through the oven top that are provided with an adjusting device for controlling the gas flow, which is not exposed to the high temperatures that usually prevail on coal carbonization and oven charging. The present invention also relates to a method for coal carbonization with the improved air feeding system.

Heating of non-recovery or heat recovery ovens is usually effected by combustion of gas evolving on coal carbonization. Combustion is so controlled that part of the gas is burned above the coal charge with primary air in the oven chamber. This partly burned gas is supplied through ducts, which are also designated as downcomer-channels, to the heating flues in the oven chamber sole and completely burned here by addition of further combustion air, i.e. secondary air.

In this manner, heat is supplied to the coal charge directly from the top and indirectly from the bottom, taking an advantageous effect on the carbonization rate and thus also on the oven performance rate. To carry out the method it is required to exactly measure the supplied primary air and secondary air and to control these variably during the coking time. In prior art technology, flat-type "heat recovery" and "non-recovery" coke ovens have been extensively described. For example, reference is taken to U.S. Pat. No. 4,344,820 A, U.S. Pat. No. 4,287,024 A, U.S. Pat. No. 5,114,542 A, GB 1555400 A or CA 2052177 C.

To implement the method, several ovens charged one after another to bridge the time of the coal charging procedure are usually operated at the same time. When operating several ovens, these ovens are generally built in a series adjacent to each other. In designating combinations of ovens, it is general practice to designate a combination of several coke ovens of the "non-recovery" type or "heat recovery" type as an "oven bank". A combination of conventional coke ovens, however, is called an "oven battery".

According to the conventional state of the art in technology, primary air is aspirated from the atmosphere through openings in the doors. Secondary air is aspirated through openings in the bottom plinths of the coke oven chambers and passed via channels into the heating flues which essentially extend horizontally under the coke oven chamber. The openings for primary and secondary air are either opened permanently or provided with adjustment devices to regulate the amount of air to be aspirated.

In operation of coke ovens, it is found that the coke ovens are charged with air in different intensities, depending on the prevailing weather conditions, thus leading to inhomogeneous combustion and a deterioration of the reproducibility of the cokemaking process. With stronger winds, the combustion velocity in the environment of the door rises substantially, while only incomplete combustion is achieved at a slower air velocity. Moreover, combustion achieved in the upper part of the oven is inhomogeneous only. For this reason, openings above the door area would yield a substantial benefit. Openings in this area, however, are difficult to provide because the design and construction of the door area stands in opposition to implementing openings above the door area.

In general, coke oven batteries are operated cyclically. A typical cokemaking cycle generally takes 20 to 96 hrs, whereupon the coke push is taken out from the coke oven chamber on completion of the cokemaking process. It is passed on for further processing, and the coke oven chamber is charged again without being subjected to a cleaning procedure. For this purpose, the coke oven chamber doors existing on either side of the oven are opened and the interior of the coke oven chamber is emptied towards the other side, using a pusher ram. This procedure basically takes just a few minutes. Access to the interior of the coking chamber is afforded by opening the oven doors which are moved to a position above the oven opening to allow for executing the charging procedure. The doors remain in this position for the period of coal charging.

An oven door is usually made of metal and has a thickness of several centimeters. Therefore, the oven door heat up substantially in the course of the cokemaking process. When it is moved into the position envisaged for the charging procedure, the external wall of the oven chamber lying above the oven door heats up very much, because the distance of the door from the oven chamber when being in the charging position is only very small. Existing adjustment devices for the amount of supplied primary air which are located in this area can therefore be deformed due to strong heat. They must then be renewed after some charging cycles. This involves added cost. Moreover, a deformation of the adjustment device would cause it not to be able to perform its regulating function adequately. The consequence is an uneven cokemaking process and a coke product that is marked by worsened quality.

BRIEF SUMMARY OF THE INVENTION

It is therefore the task of the present invention to provide a system for supply of air to a coke oven battery provided above the door structure and not detrimentally affected by the heat of an oven door being in the "open" position. The device should not cause additional cost by its design and nevertheless allow for a reliable, possibly controllable supply of air above the door area.

DETAILED DESCRIPTION OF THE INVENTION

Figure 1:
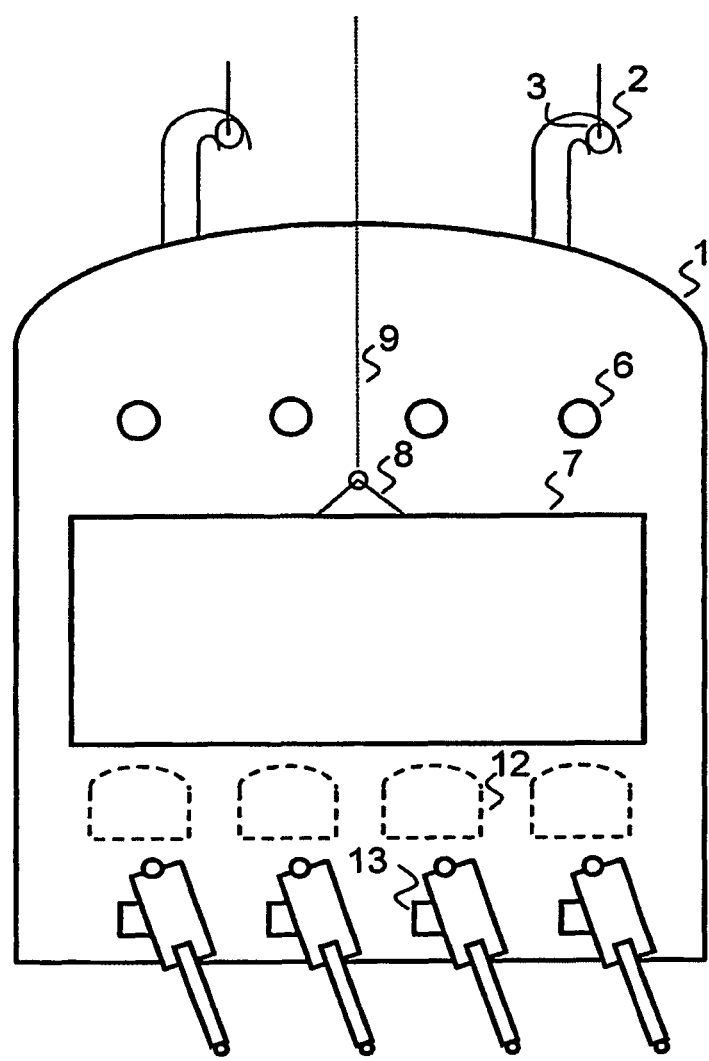
FIG. 1 shows a coke oven viewed from the front perspective.

The invention solves this problem by one or more non-controlled openings in the oven wall above the door area or in the upper door area comprised of a heat-proof material through which part of the primary air can be guided, and by one or more additional openings above the door area, and by further air feeder ducts conducting primary air through the oven top and comprising controllable locking elements, by which additional primary air can be passed through these air feeder ducts into the oven chamber. The non-controlled openings above the door area or in the upper door area are preferably configured as a nozzle and the non-controlled opening above the oven door is a nozzle built of a refractory aluminiferous or siliciferous oxidized material. The term "nozzle" is understood to be any type of an opening that narrow in a taper or section-wise. The cross-section of the nozzle on its course into the oven is narrowed in a taper or section-wise. Thereby, a higher inflow velocity with a smaller cross-section of the opening is enabled by exploiting the Venturi effect in the area above the door, too, and it is intended to be insensitive to heat. The nozzle comprises no controlling facility and therefore it is non-sensitive to the heat dissipated by the door after lifting it during the charging process to the oven wall and, consequently, to the nozzle structure. The invention furthermore solves this problem by one or more additional air feeder ducts through the oven top area. However, in order to allow for a controllable and possibly wind-independent supply of air, the additional air feeder ducts in the coke oven top area are equipped with devices for adjusting the air intake. For further improvement of the cokemaking process, it is also possible on a case by case basis to feed a foreign medium instead of air. For example, this foreign medium can be a fuel gas or an inert gas.

By supplying air into the oven above the door area, the cokemaking procedure is much more homogeneous, particularly during the initial phase of the carbonization process: Cycle times can therefore be shortened and the product obtained attains an improved quality. The inventive feeding facilities for the primary gas medium also allow for a largely weather-independent operation of the coke ovens.

Claim is in particular laid to a device for the supply of combustion air for combustion of coking gas in a coking chamber of a coke oven of the Non-recovery type or heat recovery type, wherein a coke oven comprising openings in the oven chamber of the coke oven through which the oven chamber can be charged with primary air, and the coke oven in the heating flues in the oven chamber sole of the oven comprises openings through which the heating flues can be charged with secondary air, and the coke oven comprises downcomer-channels which inside the oven allow for guiding partially burned gas for combustion with secondary air from the oven chamber into the heating flues of the oven, and which is characterized in that in the oven wall above the door area or in the upper door area there are one or more non-controlled openings comprised of a heat-proof material through which part of the primary air can be guided, and in the top area of the oven there are further air feeder ducts conducting primary air through the oven top and comprising controllable locking elements, by which additional primary air can be passed through these air feeder ducts into the oven chamber.

The refractory material utilized for building the nozzle is a siliciferous oxidized or aluminiferous oxidized or a siliciferous-aluminiferous oxidized material. Nozzles from a silica product are generally given preference. For example, it is possible to use a nozzle made of quartz. But it is also possible to use a nozzle made of clay, fireclay, or felspar. Finally it is also possible to utilize a nozzle made of an oxidic material containing aluminium, for example corundum is mentioned here as a suitable fabrication material for the nozzle. A selection of suitable substances including a sketch (Sketch 1) can be found in Catalogue of Dr. C. Otto Feuerfest GmbH, Feuerfest-Erzeugnisse, Rohstoffe and Zusammensetzungen, page 11, Bochum, Germany, 1996.

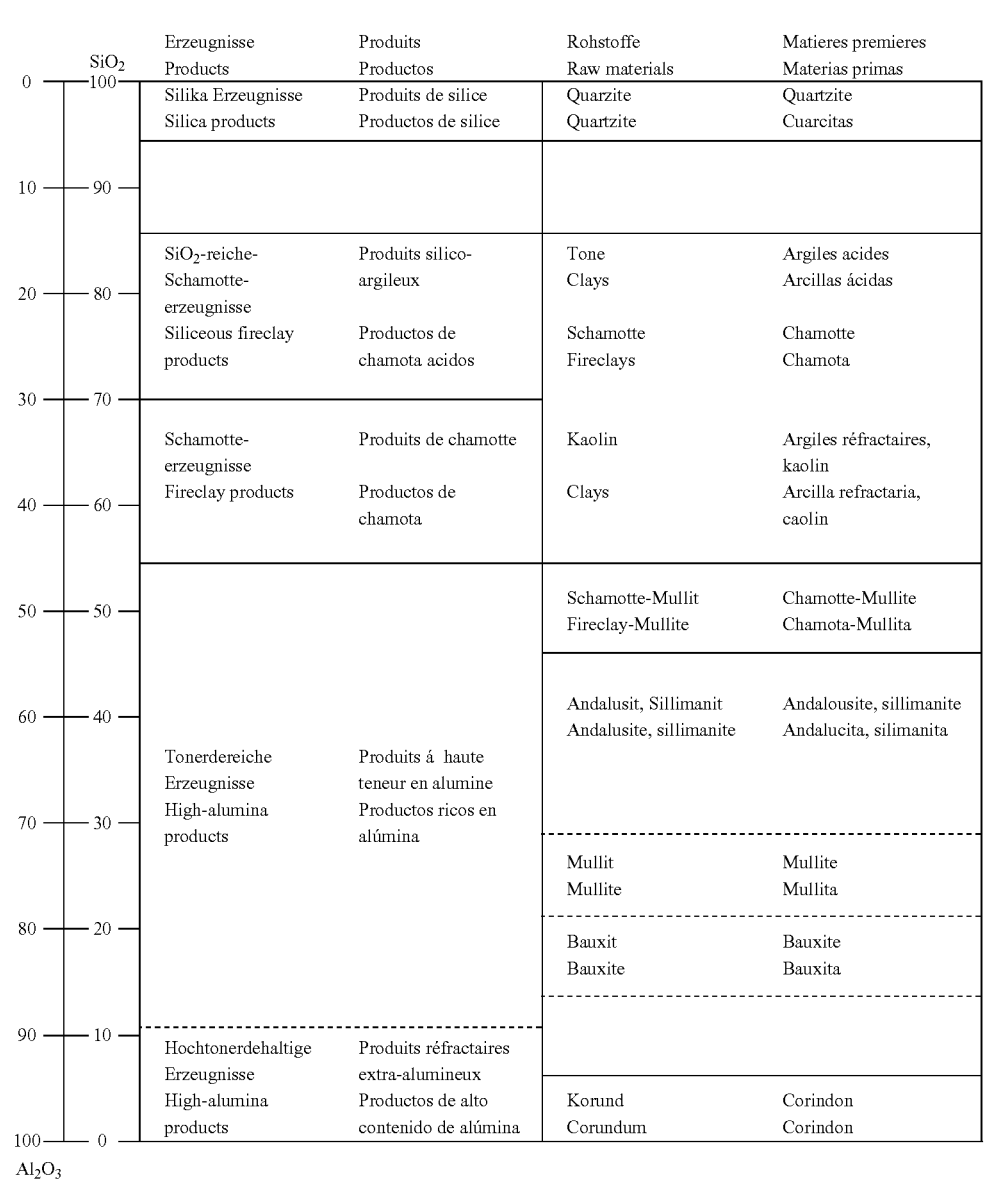

Sketch 1

Suitable for the manufacture of the nozzle are materials made of an oxidic substance containing silicon or aluminium or silicon and aluminium.

The number of nozzles and air feeder ducts in the top area for designing the inventive device may be optional. It is possible to utilize two nozzles and two air feeder ducts per oven, but even several nozzles or several air feeder ducts can be utilized. In a preferred embodiment, one oven is comprised of four nozzles in the front area and four air feeder ducts in the top area.

The design of the inventive device also allows to install the nozzles into the door. This makes sense in particular when the oven door closes the entire oven opening in the oven structure. At their oven outward end, the nozzles may be provided with a measuring device that measures the flow velocity of the inflowing air or an inflowing gas. If required, these measuring facilities can also be equipped with protective devices to protect them from high temperatures.

For optimal control of the air flow, the nozzles are preferably guided vertically through the oven wall situated above the door. But it is also possible to guide the nozzles obliquely through the oven wall or oven door to optimize the inflowing gas. Depending on the course and requirements of the cokemaking process, the nozzles can be guided at any angle through the oven wall. For a better control of the inflowing air or gas stream, the nozzles can also be provided with a continuation or with twist-generating devices. These may be grooves or suitable air and gas stream guidance facilities.

The additional air feeder ducts in the top area supply the coke oven batteries with additional primary air during the entire or further course of the cokemaking process. Moreover, they allow for implementing a controlling device because the top area is not exposed to the heat of the retracted oven door. To protect the oven area from pollutants, the air or gas feeder ducts are so configured that the air or gas feeder facility is protected from weather impacts. Therefore, the pipe is advantageously bent around a horizontal axis at an angle of 90° to 270°. It is also possible to bend the pipe around a horizontal axis at an angle of 0 to 360°. In an exemplified embodiment of the invention, the air feeder device in the top area is shaped as a U-pipe. Finally it is possible to configure the air feeder system as a siphon or to route the pipes under a facility providing protection from weather impacts.

The adjusting device of the oven top feeder ducts can be so configured as is common practice according to the state of the art. WO 2007/057076 A1 describes a system for controlling coke oven air feed by actuators. Accordingly, air is supplied through openings of the air feeder ducts wherein a movably supported locking element is embedded or situated in front thereof, and wherein the locking elements of the air feeder ducts are mechanically connected to an actuator element which is controlled and driven from a central unit. Depending on the demand for combustion air in the coking chamber, the locking elements can be actuated by means of an actuator element. To ensure individual adjustment of the controlling facilities of the individual coke ovens, the mechanical connection of each locking element to the central actuator unit can be executed separately.

Primarily eligible as locking elements are locking plates or locking flaps, but spindles or cone-shaped locking elements can also be used. In an advantageous embodiment, when using flaps, these are adapted to the opening cross-section and movably suspended to the centre axis in rotation symmetry. When using helical spindles or cones, the locking elements on the side pointing outwardly from the oven are larger in cross-section than the locking opening, and on the side pointing to the oven they are smaller than the locking opening so that the locking opening can gradually be locked towards it with the approaching movement of the locking element. It is also possible to use slide gates made of plates which are pushed-on depending on the desired amount of air flow intake. The locking elements can be situated at any point within the pipe. Moreover, they can be suspended at any angle to the direction of flow.

It is also possible to hang plates instead of adjusting elements in front of the air feeder ducts. These plates can be fabricated in ring shape or in any other shape. Depending on the desired amount of air intake, plates with a different cross-section can then be hung-up in the pipe. Thereby, the air intake flow in the air feeder duct can also be adjusted. The plates, too, can be situated at any place inside the pipe. Moreover, they can be suspended at any angle to the direction of flow. For controlling the air intake flow, however, preference is given to using controllable actuator elements.

To visually check the cokemaking process, the air or gas feeder ducts can be provided with lockable plates in the duct or pipe wall. These can be opened to allow for checking the cokemaking process. It is also possible to use an inspection sight glass instead of a flap. The check flaps or sight glasses can also be mounted in the top of the coke oven instead of being mounted in the pipe if the sight glasses are built in refractory material and if the temperature at the oven top is not too high.

The air feeder ducts through the oven top can be put on in pivoted arrangement to provide better protection from strong wind. Depending on the wind direction, the air feeder ducts can then be so rotated that the openings are directed opposite to the wind direction. For optimal controlling of the air flow, the ducts, too, are preferably guided vertically through the oven top. But it is also possible to guide the ducts obliquely through the oven top to optimize the inflowing gas. Depending on the course and requirements of the cokemaking process, the ducts can be conducted at any angle through the oven wall. For a better control of the inflowing air or gas stream, the ducts can also be provided with continuations or with twist-generating devices. These may be grooves or suitable air and gas stream guidance facilities.

Owing to the high temperature of the coke ovens and due to dust particles emitted, the actuator unit for controlling the air intake actuator elements is preferably driven mechanically. The pulse transmission can be effected via suitable transmission mechanisms. Primarily suitable for this purpose are chains as well as rod and bar linkages, but rope hoists, lever facilities and toothed gear devices are in principle suitable, too. Even electrically driven adjustment facilities are in principle conceivable for this application, provided they are adequately designed and provided with a protection. In principle, all devices allowing for driving the air feeder actuator elements are suitable.

The present invention can explicitly be implemented for all combinations of coke ovens, both for individual ovens and for coke ovens in any combination. It can explicitly be implemented for oven batteries as well as for oven banks. It can also be implemented for different designs of coke ovens, provided the design is suitable for the production of coke.

The device for driving and controlling the actuator elements can be so configured that the actuator elements can thereby be activated individually. However, to reduce the expenditure, the driving and controlling unit can also be so configured that the adjusting elements of an individual oven can thereby be activated. Finally, the driving and controlling unit can also be so configured that the adjusting elements of the entire oven battery or of the entire oven bank can thereby be regulated simultaneously. For example, it is possible to activate the adjusting devices of a coke oven along its longitudinal direction. But it is also possible to activate a special adjusting device series of a coke oven battery or coke oven bank simultaneously along the cross direction.

To implement the inventive method, the openings of the pipes preferably have a circular shape in the area of the cross section. But it is also possible to give these openings an oval or a rectangular shape. The configuration of the area of the cross section is best made in a way as best permitted by spatial and geometrical designs of coke oven batteries. The run of the air or gas feeder ducts is provided so as to contract the cross section of the pipe in its run or section-wise. Thereby, the flow velocity of air in the pipe will rise due to the Venturi effect. This makes sense in particular with narrow pipes, the cross section of which cannot be chosen larger for space related considerations.

In an embodiment of the present invention, the individual air feeder ducts are connected to each other by pipes. Thus, one obtains just one or two air feeder openings for an entire coke oven battery. By this design, the air feeding procedure can be better controlled and the openings are better protected from foreign matter and pollutants.

The nozzle, too, can be of a round, oval or rectangular configuration in the area of the cross section. To make the production of the nozzle above the door area cost efficient, however, preference is given to a round area of the cross section. The inner cross section of the nozzle on its way into the oven is contracted toward the end or section-wise. Thus, a higher inflow velocity with a smaller cross section is made possible even in the area above the door by exploiting the Venturi effect.

For the design of an inventive oven battery, the oven doors can be of such a configuration that they open the opening of the oven by being lifted. But they can also be of such a configuration that they are opened by being pulled or pushed open. For the implementation of the design, the door is best built of a refractory or temperature-resistant material. In designing the oven doors, usual openings for air feeding can be dispensed with in implementing the present invention. But it is also possible to maintain these openings.

Also claimed is a method by which the inventive device can be operated for the production of coke. Particularly claimed is a method utilized for the carbonization of coal, applying a so-called heat recovery or non-recovery oven, whereby charging coal in the oven chamber of the coke oven with primary air, and combusting a part of the evolving gas on coal carbonization above the coal charge with primary air in the oven chamber, and supplying the partially combusted gas through downcomer-channels to the heating flues in the oven chamber sole, and combusting the non-burned or partially burned gas with secondary air in the heating flues, and which is characterized in that the primary air reaches through a non-controllable opening or through non-controllable openings installed in the oven wall situated above the oven door or installed in the upper door area into the coke oven, and the primary air reaches through an air feeder duct leading through the oven top or through air feeder ducts leading through the oven wall into the oven chamber of the coke oven, and the air admittance by the air feeder ducts is controlled.

Applying this method, a coal carbonization process can be utilized which in its details of coke production can be operated in the same manner as a conventional process. To put an example, the pre-warmed coking chamber is charged with a layer of coal and then closed. The coal is then heated so that volatile coal constituents degas from the coal charge. Via the primary air, the volatile coal constituents are partially oxidized by means of air. This gas mixture streams through flue gas channels arranged in the coke oven chamber or in the side walls into the coke oven sole where non-burned volatile coal constituents are burned. A particularly suitable embodiment in which supplied steam serves for controlling the coke oven chamber temperature is described in DE 102006005189 A1.

In one embodiment of the inventive method, the openings situated above the oven door and in the oven wall are closed after a short start-up phase of the coke oven. This makes sense in particular with unfavourable winds pressing laterally into the oven which cause inflaming of the coking process and thus a non-desired rise in temperature. It is possible to operate the inventive method only with the nozzles above the door area or only with the air or gas feeder ducts in the oven top area, but in most cases this will entail a less favourable course of the cokemaking process.

For implementing the inventive method, it is also possible to close the nozzle throughout the time of the cokemaking process and to provide the supply of air only through the air feeder ducts in the oven top area. Then, however, the cokemaking process in the upper part of the coke cake will take a substantially less homogeneous course. The quality of the coke output, too, will be clearly worse. Likewise it is possible for implementing the inventive method to dispense with the air feeder ducts in the oven top and to utilize only the refractory nozzle in the upper oven wall for feeding of air. In this case, too, the cokemaking process in the upper part of the coke cake will take a substantially less homogeneous course and the quality of coke obtained is clearly worse.

The supply of air to a coke oven battery in the areas above the oven door is particularly important during the initial phase in order to ensure a homogeneous cokemaking procedure in the entire coke oven battery. With high external wind velocities, however, it may make sense to close the nozzles after the start-up phase. Particularly eligible for this purpose are cone-shaped locking elements or helical spindles.

The system of air feeding makes it also possible to feed a foreign medium instead of air for combustion, which for example may be a gas or a vaporous medium. It may happen that an additional fuel gas must be utilized when carbonizing a coal which has a low portion of volatile matter. This leads to a better combustion so that a better coke quality is obtained. In few cases it may be advantageous to pass an inert gas into the coke oven. This will in particular be the case if gas is to be used for cooling or tempering, or if the cokemaking process is to be influenced in its duration of time. As a matter of fact it is also possible to use a mixture of air or fuel gas or inert gas instead of air or fuel gas or inert gas. Finally, air, a fuel gas or an inert gas in any combination and in any quantitative ratio can be utilized.

Suitable for application as fuel gas are, for example, coke oven gas, blast furnace gas, waste gas, generator gas, converter gas, flue gas, synthesis gas, liquid gas or LPG, natural gas, biogas or water gas. These are mentioned here just as examples for a typical embodiment. Particularly suitable as inert gas is steam or low pressure steam. In a preferred embodiment, these are mixed with air. But it is also possible to use nitrogen, carbon dioxide or noble gases as inert gas.

In an embodiment of the invention, the supplied air or the supplied foreign medium are passed into the coke oven in preheated condition. For this purpose, these gases can be preheated by any type of suitable device. In another embodiment of the present invention, the gases are preheated by regeneration or recuperation. If required, the supplied media can also be fed-in at a slightly positive pressure.

In general, the foreign medium is supplied through the nozzles in the oven wall above the door area or in the oven door. In principle it is also possible to supply the foreign medium through the air or gas feeder ducts in the oven top area. For example, this is provided for in those cases in which the cokemaking process must be adapted when charging a different coal basis.

In an embodiment of the inventive method, it is possible to close the nozzles by a material that is used once and then removed. Examples for this application are silica products, metal bodies, gypsum or mortar. But any refractory material is in principle suitable. It is also possible to close the nozzles by removable plugs, for example by a plug rod or an insulating stopper. Upon closure, the supply of primary air or gas is then effected through the air or gas feeder duct via the oven top. A closure of the nozzles after the start-up phase makes sense in particular if lateral winds through the nozzles cause excessive inflaming of the cokemaking process.

In another embodiment of the inventive method it is possible to exchange the nozzles in the course of the cokemaking process. Depending on the desired amount of admitted air or gas, nozzles with a different cross section are built in. Thereby, the air or gas intake into the oven can be well adjusted in the area above the oven door. As a matter of fact, these process steps mentioned above can be implemented with a single coke oven battery, but also simultaneously or staggered in time with several or all ovens of a coke oven battery.

The described inventive method with several openings above the door area of a coke oven battery involves the advantage that the cokemaking process can be configured so as to be very even and with a largely homogeneous distribution of temperature over the entire area of a coke oven. The coke thus obtained therefore is of a high quality and the coke yield relative to coal consumption is high. For manufacture as compared with conventional devices, the inventive device calls for only few apparatus-related changes so that it is easy to manufacture it at little expenditure.

The inventive configuration of the device for carbonization of coal is explained in greater detail by way of four drawings, with the inventive method not being restricted to these embodiments.

FIG. 1 exemplifies a coke oven viewed from the front perspective. On its top, the coke oven (1) is comprised of the inventive air or gas feeder ducts (2) for primary air, here in the preferred embodiment as U-tubes. These air or gas feeder ducts are provided with adjusting devices (3) for controlling the air or gas flow. Situated above the door area are the inventive nozzle-shaped openings (6) for feeding primary air or gas, made of a refractory material, which can be closed on demand. Located underneath are the oven doors (7), here closing the access opening to the coke oven in the "closed" position. The oven doors are fastened via a connecting element (8) to a rod and bar linkage (9) by way of which the oven doors can be pushed open into the "open" position. The secondary air mains (12) connected to the "downcomer" channels as well as the controllable entry openings for secondary air (13) are situated under the doors.

Figure 2:
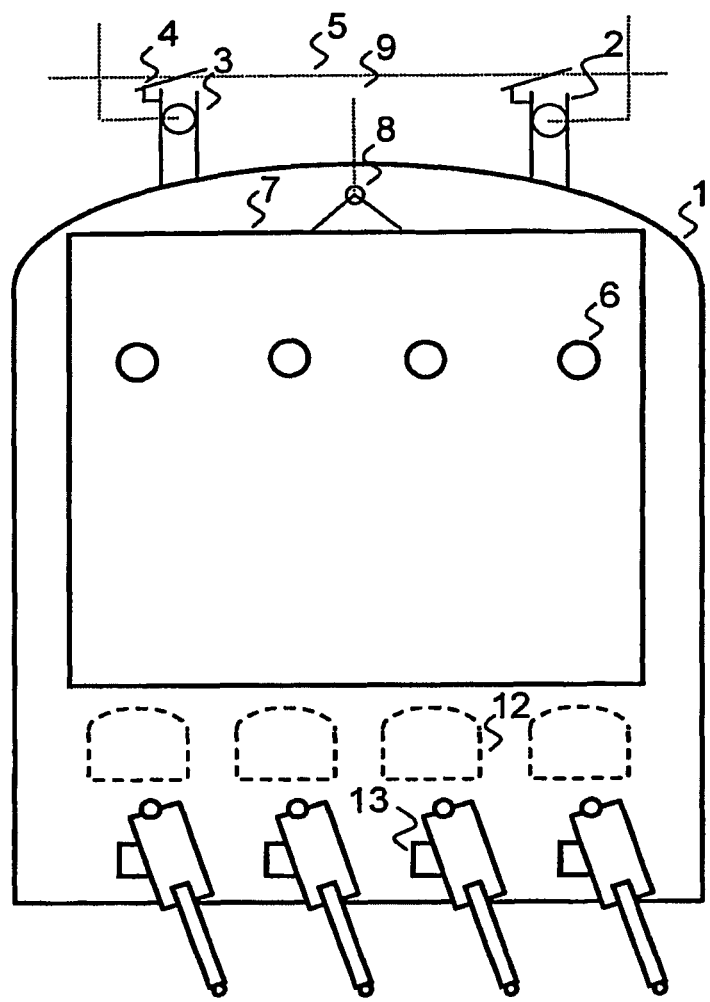
FIG. 2 shows a coke oven viewed from the front perspective.

FIG. 2 exemplifies a coke oven viewed from the front perspective. On its top, the coke oven (1) is comprised of the inventive air or gas feeder ducts (2) for primary air, here in an embodiment with a cover plate (4) to provide protection from weather impacts. These air or gas feeder ducts are provided with adjusting devices (3) for controlling the air or gas flow. In this drawing, the adjusting devices (3) are connected to a rod and bar linkage (5) so that the adjusting devices of the oven can be operated simultaneously. The openings of the oven here extend over the entire front area, with the door (7) covering these openings completely. Here, the inventive nozzle-shaped openings (6) made of a refractory material are mounted in the door (7). The door (7) here is shown in its "closed" position. The oven doors are fastened via a connecting element (8) to a rod and bar linkage (9), by way of which the oven doors can be pushed open into the "open" position. The secondary air mains (12) linked to "downcomer" channels and the controllable entry openings for secondary air (13) are located underneath the door.

Figure 3:
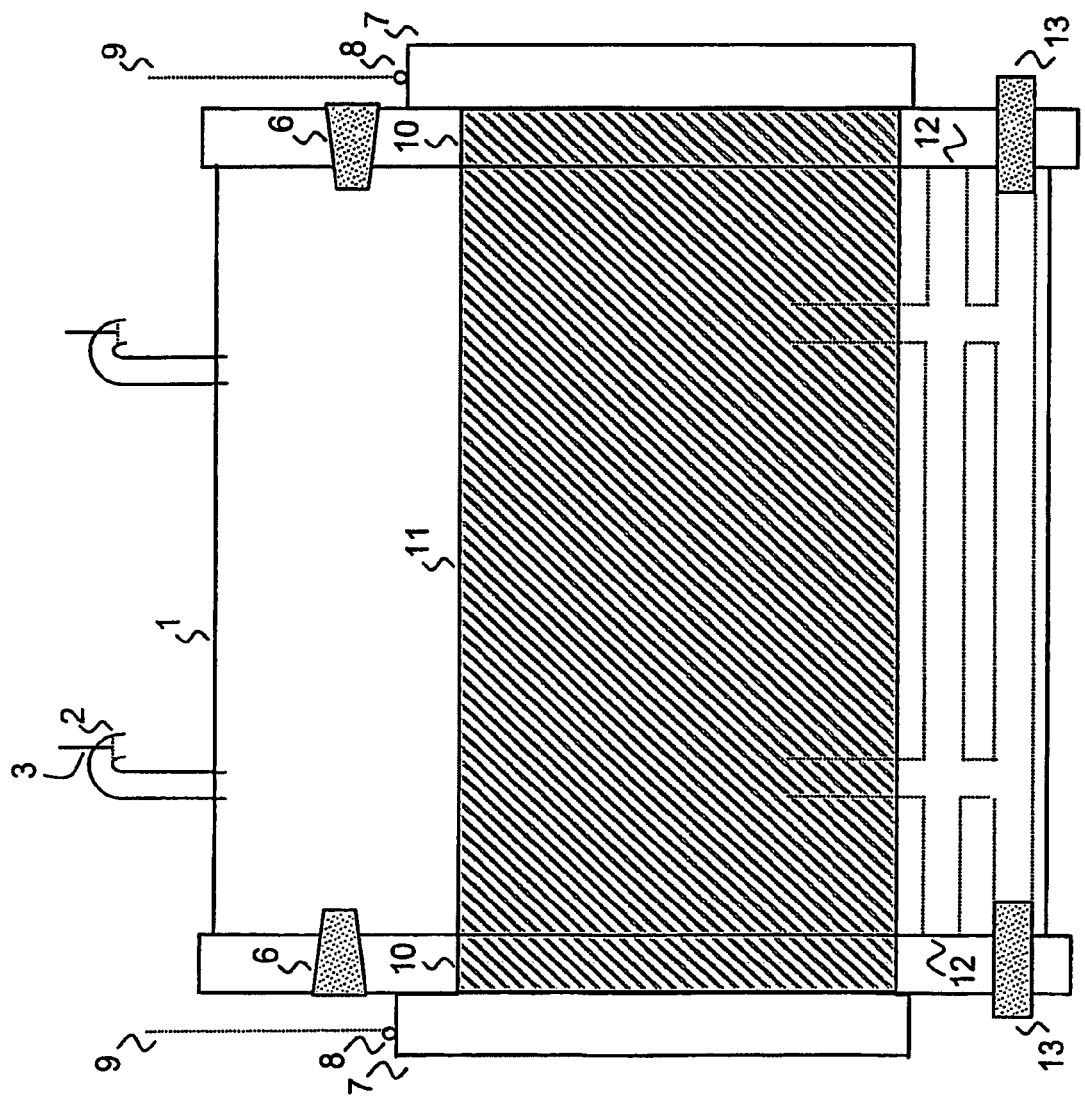
FIG. 3 shows a coke oven viewed from the lateral perspective.

FIG. 3 exemplifies a coke oven viewed from the lateral perspective. On its top, the coke oven (1) is comprised of the inventive air or gas feeder ducts (2) for primary air, here in the preferred embodiment as U-tubes. These air or gas feeder ducts are provided with adjusting devices (3) for controlling the air or gas flow. Mounted above the door area are the inventive nozzle-shaped front openings (6) made of a refractory material which can be closed on demand and which protrude into the area of the coal or coke cake (11). Located at the front is the oven door (7), here closing the access opening to the coke oven in its "closed" position. The oven door closes the opening to the oven (10) which in its lower part is charged with a coke cake (11). The oven doors are fastened via a connecting element (8) to a rod and bar linkage (9) by way of which the oven doors can be pushed open into the "open" position. The secondary air mains (12) connected to "downcomer" channels and the entry openings for secondary air (13) are located under the door.

Figure 4:
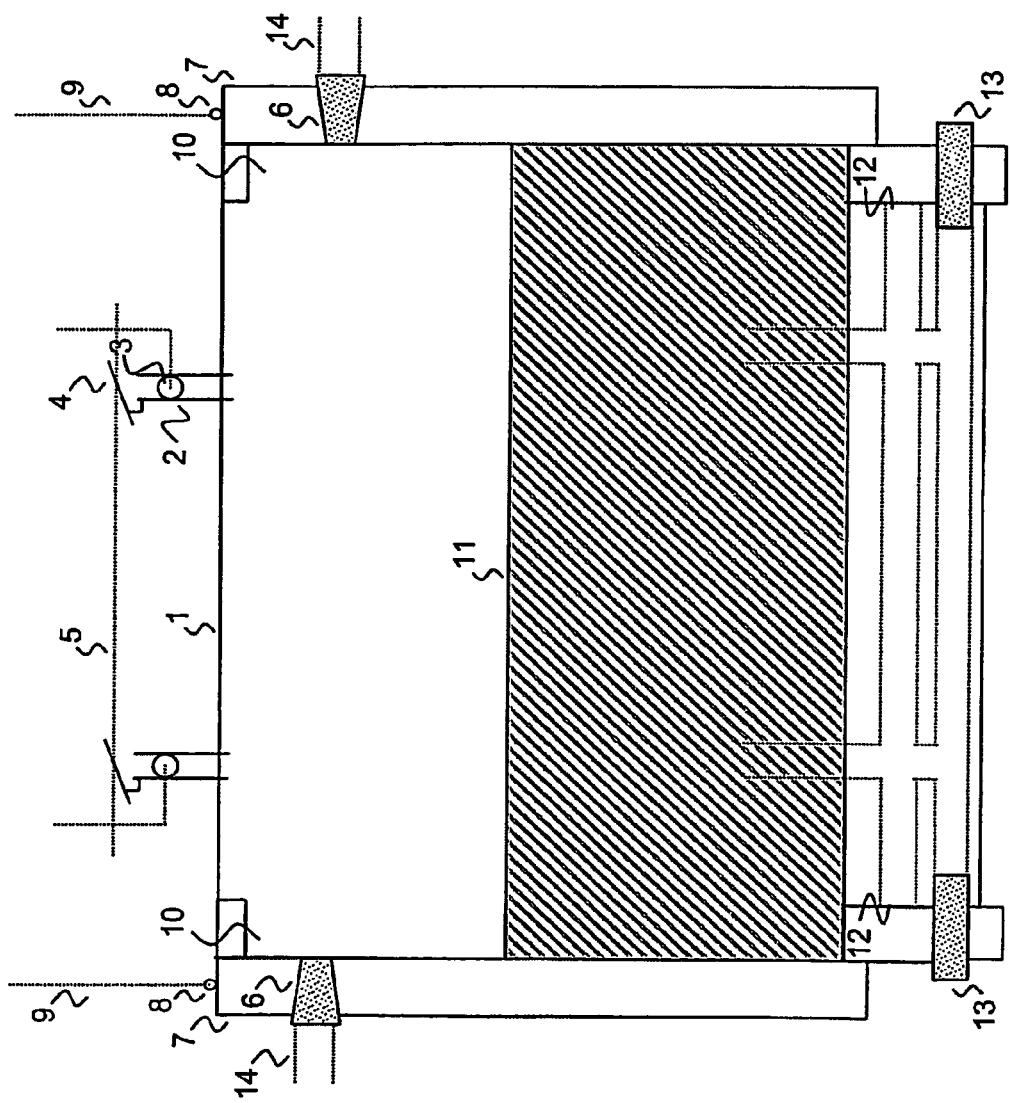
FIG. 4 shows a coke oven viewed from the lateral perspective.

FIG. 4 exemplifies a coke oven viewed from the lateral perspective. On its top, the coke oven (1) is comprised of the inventive air or gas feeder ducts (2) for primary air, here in an embodiment with a cover plate (4) to provide protection from weather impacts. These air or gas feeder ducts are provided with adjusting devices (3) for controlling the air or gas flow. In this drawing, the adjusting devices (3) are connected to each other by a rod and bar linkage (5) so that the adjusting devices of the oven can be operated simultaneously. Here, the inventive nozzle-shaped front openings (6) made of a refractory material are mounted in the door. On demand, they can be closed and they may protrude into the area of the coal or coke cake (11). Located at the front are the oven doors (7), here closing the access openings to the coke oven in "closed" position. The oven door closes the oven opening (10), which in its lower area is charged with a coke cake. The oven doors are fastened via a connecting element (8) to a rod and bar linkage (9) by way of which the oven doors can be pushed open into the "open" position. The secondary air mains (12) linked to "downcomer" channels and the entry openings for secondary air (13) are located under the door. The nozzle-shaped front openings for feeding primary air or gas (6) in the coke oven chamber wall are fitted with extension pipes (14) which may be provided with a flow velocity measuring device.

List of reference numbers

| | |
|---|---|
| 1 | Coke oven |
| 2 | Air or gas feeder ducts for primary air |
| 3 | Adjusting devices for controlling the air or gas flow |
| 4 | Cover plate to provide protection from weather impacts |
| 5 | Connecting rod and bar linkage to control the adjusting device or the flaps |
| 6 | Nozzle-shaped front opening for feeding primary air or gas |
| 7 | Oven door |
| 8 | Connecting element to a rod and bar linkage and oven door |
| 9 | Control rod and bar linkage for opening the oven door |
| 10 | Opening to the oven, charged with a coke cake in the lower part |
| 11 | Coal or coke cake |
| 12 | Secondary air sole or secondary air mains |
| 13 | Entry openings for secondary air |
| 14 | Extension pipe for flow velocity measuring devices |

The invention claimed is:

1. A method for feeding primary combustion air into a coking chamber of a coke oven of the non-recovery or heat recovery type comprising:
    charging coal in the oven chamber of the coke oven with primary air, and combusting a part of the evolving gas on coal carbonization above the coal charge with primary air in the oven chamber, and
    supplying the partially combusted gas through downcomer-channels to the heating flues in the oven chamber sole, and combusting the non-burned or partially burned gas with secondary air in the heating flues, and wherein
    the primary air reaches through a non-controllable opening or through non-controllable openings installed in the oven wall situated above the oven door or installed in the upper door area into the coke oven, and
    the primary air reaches through an air feeder duct leading through the oven top or through air feeder ducts leading through the oven wall into the oven chamber of the coke oven, and the air admittance by the air feeder ducts is controlled.

2. The method for feeding primary combustion air into a coking chamber of a coke oven of the non-recovery or heat recovery type according to claim 1, wherein the air supplied through the non-controllable openings in the oven wall above the oven door, in the oven door or through the air feeder ducts in the oven top area is preheated.

3. The method for feeding primary combustion air into a coking chamber of a coke oven of the non-recovery or heat recovery type according to claim 2, wherein the air supplied through the non-controllable openings in the oven wall above the oven door, in the oven door or through the air feeder ducts in the oven top area is preheated by a recuperative heating process, or a regenerative heating process.

4. The method for feeding primary combustion air into a coking chamber of a coke oven of the non-recovery or heat recovery type according to claim 1, wherein the non-controllable openings situated above the oven door are closed after a start-up phase of the cokemaking process.

5. The method for feeding primary combustion air into a coking chamber of a coke oven of the non-recovery or heat recovery type according to claim 4, wherein the non-controllable openings situated above the oven door are closed after the start-up phase of the cokemaking process with a removable plug made of a refractory material or with a plug rod.

6. The method for feeding primary combustion air into a coking chamber of a coke oven of the non-recovery or heat recovery type according to claim 1, comprising exchanging the non-controllable openings situated above the oven door in the course of the coke-making process with non-controllable openings with a different cross-section.

7. The method for feeding primary combustion air into a coking chamber of a coke oven of the non-recovery or heat recovery type according to claim 1, wherein the primary air is supplied at a slightly positive pressure.

8. The method for feeding primary combustion air into a coking chamber of a coke oven of the non-recovery or heat recovery type according to claim 1, wherein the coal in the oven chamber is charged instead with primary air with a foreign medium which is a gas or vaporous medium.

9. The method for feeding primary combustion air into a coking chamber of a coke oven of the non-recovery or heat recovery type according to claim 8, wherein the foreign medium is supplied at a slightly positive pressure.

10. The method for feeding primary combustion air into a coking chamber of a coke oven of the non-recovery or heat recovery type according to claim 8, wherein the foreign medium is a fuel gas.

11. The method for feeding primary combustion air into a coking chamber of a coke oven of the non-recovery or heat recovery type according to claim 10, wherein the fuel gas is selected from the group of the gases consisting of: coke oven gas, blast furnace gas, waste gas, generator gas, converter gas, flue gas, synthesis gas, liquid gas, and biogas.

12. The method for feeding primary combustion air into a coking chamber of a coke oven of the non-recovery or heat recovery type according to claim 8, wherein the foreign medium is an inert gas.

13. The method for feeding primary combustion air into a coking chamber of a coke oven of the non-recovery or heat recovery type according to claim 12, wherein the inert gas is selected from the group of the gases consisting of: steam, nitrogen, carbon dioxide and noble gases.

14. The method for feeding primary combustion air into a coking chamber of a coke oven of the non-recovery or heat recovery type according to claim 8, wherein the foreign medium is a mixture of air or a fuel gas or an inert gas in any combination and in any quantitative ratio.

15. A device for feeding primary combustion air for the combustion of coke oven gas into a coking chamber of a coke oven of the non-recovery or heat recovery type, comprising:

a coke oven comprising openings in the oven chamber of the coke oven through which the oven chamber can be charged with primary air; and the coke oven in the heating flues in the oven chamber sole comprises openings through which the heating flues can be charged with secondary air, and coke oven comprises downcomer channels which inside the oven allow for guiding partially burned gas for combustion with secondary air from the oven chamber into the heating flues of the oven; wherein in the oven wall above the door area or in the upper door area there are one or more non-controlled openings comprised of a heat-proof material through which part of the primary air can be guided, and in the top area of the oven there are further air feeder ducts conducting primary air through the oven top and comprising controllable locking elements, by which additional primary air can be passed through these air feeder ducts into the oven chamber.

16. The device for feeding primary combustion air into a coking chamber of a coke oven of the non-recovery or heat recovery type according to claim 15, wherein the non-controlled opening above the oven door comprises a feeding device with a cross-section that is narrowed in its course into the oven in a taper or section-wise and is thus nozzle-shaped, and the feeding device is made of a refractory material.

17. The device for feeding primary combustion air into a coking chamber of a coke oven of the non-recovery or heat recovery type according to claim 16, wherein the refractory material of the nozzle-shaped feeding device in the non-controlled opening above the oven door comprises a refractory oxidic material containing silicon.

18. The device for feeding primary combustion air into a coking chamber of a coke oven of the non-recovery or heat recovery type according to claim 16, wherein the refractory material of the nozzle-shaped feeding device in the non-controlled opening above the oven door comprises a refractory oxidic material containing aluminium.

19. The device for feeding primary combustion air into a coking chamber of a coke oven of the non-recovery or heat recovery type according to claim 15, wherein the refractory material of the nozzle-shaped feeding device in the non-controlled opening above the oven door comprises a nozzle-shaped feeding device made of silica products.

20. The device for feeding primary combustion air into a coking chamber of a coke oven of the non-recovery or heat recovery type according to claim 15, wherein the non-controlled opening above the door area or in the oven door is guided perpendicularly through the oven wall or oven door.

21. The device for feeding primary combustion air into a coking chamber of a coke oven of the non-recovery or heat recovery type according to claim 15, wherein the non-controlled opening above the door area or in the oven door is guided obliquely through the oven wall or oven door.

22. The device for feeding primary combustion air into a coking chamber of a coke oven of the non-recovery or heat recovery type according to claim 15, comprising an air stream guiding facility situated in the non-controlled opening, said facility being able to stabilize the gas streaming by grooves.

23. The device for feeding primary combustion air into a coking chamber of a coke oven of the non-recovery or heat recovery type according to claim 15, wherein the air feeder ducts through the oven top arrangement are shaped as pipes bent around a horizontal axis with a bending angle of 0° to 360°.

24. The device for feeding primary combustion air into a coking chamber of a coke oven of the non-recovery or heat recovery type according to claim 15, wherein the gas quantity controlled air or gas feeder ducts through the oven top arrangement are shaped as pipes bent around a horizontal axis with a bending angle of 90° to 270°.

25. The device for feeding primary combustion air into a coking chamber of a coke oven of the non-recovery or heat recovery type according to claim 23, wherein the air feeder ducts through the oven top arrangement are routed under a covering device providing protection from weather impacts.

26. The device for feeding primary combustion air into a coking chamber of a coke oven of the non-recovery or heat recovery type according to claim 23, wherein the air feeder ducts are conducted vertically through the oven top arrangement.

27. The device for feeding primary combustion air into a coking chamber of a coke oven of the non-recovery or heat recovery type according to claim 23, wherein the air feeder ducts are conducted obliquely through the oven top arrangement.

28. The device for feeding primary combustion air into a coking chamber of a coke oven of the non-recovery or heat recovery type according to claim 23, wherein a gas stream guiding facility is situated in the opening through the oven top, said facility being able to stabilize the gas streaming through by grooves or to provide this gas with a twist by twisted grooves.

29. The device for feeding primary combustion air into a coking chamber of a coke oven of the non-recovery or heat recovery type according to claim 23, wherein the air feeder ducts through the oven top arrangement are pivoted and rotatable in the vertical axis.

30. The device for feeding combustion air into a coking chamber of a coke oven of the non-recovery or heat recovery type according to claim 23, wherein the air feeder ducts of more than one coke oven in a coke oven battery are connected to each other by a connecting pipe and are jointly ventilated.

31. The device for feeding primary combustion air into a coking chamber of a coke oven of the non-recovery or heat recovery type according to claim 23, wherein an opening that may serve for observing the oven interior is situated in the air feeder duct in the oven top.

32. The device for feeding primary combustion air into a coking chamber of a coke oven of the non-recovery or heat recovery type according to claim 31, wherein the opening is configured as a flap which can be opened for observing and be closed again.

33. The device for feeding primary combustion air into a coking chamber of a coke oven of the non-recovery or heat recovery type according to claim 31, wherein the opening is configured as a sight glass.

34. The device for feeding primary combustion air into a coking chamber of a coke oven of the non-recovery or heat recovery type according to claim 15, wherein the locking elements for the primary air flow control are mechanically connected to each other, and are connected to a mechanical actuator element which is controlled and driven from a central unit, and in that at least part of the locking elements for secondary air is connected to another actuator element, which is controlled and driven from a central unit.

35. The device for feeding primary combustion air into a coking chamber of a coke oven of the non-recovery or heat recovery type according to claim 34, wherein the actuator element is a centrally arranged pivoting flap.

36. The device for feeding primary combustion air into a coking chamber of a coke oven of the non-recovery or heat recovery type according to claim 34, wherein the locking element is a flap which varies the cross-section of the air feeder duct in size and which can be suspended in the air feeder duct.

37. The device for feeding primary combustion air into a coking chamber of a coke oven of the non-recovery or heat recovery type according to claim 15, wherein the locking elements can be applied along the longitudinal direction of a single coke oven for a simultaneous controlling of the air feeder ducts of the coke oven.

38. The device for feeding primary combustion air into a coking chamber of a coke oven of the non-recovery or heat recovery type according to claim 15, wherein the locking element can be implemented along the cross direction of a coke oven battery for controlling the same air feeder duct of each coke oven.

39. The device for feeding primary combustion air into a coking chamber of a coke oven of the non-recovery or heat recovery type according to claim 15, wherein the locking element can be implemented for individual controlling of the air feeder ducts of all coke ovens.

40. The device for feeding primary combustion air into a coking chamber of a coke oven of the non-recovery or heat recovery type according to claim 15, wherein the area of the cross section of the air feeder ducts is circular.

41. The device for feeding primary combustion air into a coking chamber of a coke oven of the non-recovery or heat recovery type according to claim 15, wherein the area of the cross section of the air feeder ducts is oval.

42. The device for feeding primary combustion air into a coking chamber of a coke oven of the non-recovery or heat recovery type according to in claim 15, wherein the non-controllable openings situated above the oven door have been calibrated according to spatial and geometrical designs of a coke oven as best permitted for controlling the supplied air volume.

43. The device for feeding primary combustion air into a coking chamber of a coke oven of the non-recovery or heat recovery type according to claim 15, wherein the air feeder ducts through the oven top narrows in their cross section in the course of the duct so that a higher flow velocity prevails in the duct.

44. The device for feeding primary combustion air into a coking chamber of a coke oven of the non-recovery or heat recovery type according to claim 15, comprising a device for observing the cokemaking process through the oven top which is configured as a flap which can be opened for observing and be closed again.

45. The device for feeding primary combustion air into a coking chamber of a coke oven of the non-recovery or heat recovery type according to claim 15, comprising a device for observing the cokemaking process through the oven top which is configured as a sight glass.

46. The device for feeding primary combustion air into a coking chamber of a coke oven of the non-recovery or heat recovery type according to claim 15, comprising an air stream guiding facility situated in the non-controlled opening, said facility providing the air with a twist by twisted grooves.

* * * * *

UNITED STATES PATENT AND TRADEMARK OFFICE
CERTIFICATE OF CORRECTION

PATENT NO.        : 8,647,476 B2                                        Page 1 of 1
APPLICATION NO.   : 12/733517
DATED             : February 11, 2014
INVENTOR(S)       : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-ninth Day of September, 2015

Michelle K. Lee
*Director of the United States Patent and Trademark Office*